United States Patent
Tsai

(10) Patent No.: US 8,422,813 B2
(45) Date of Patent: *Apr. 16, 2013

(54) IMAGE PROCESSING DEVICE AND IMAGE PROCESSING METHOD

(75) Inventor: Chi-Yi Tsai, Taipei (TW)

(73) Assignee: Asustek Computer Inc., Taipei (TW)

( * ) Notice: Subject to any disclaimer, the term of this patent is extended or adjusted under 35 U.S.C. 154(b) by 471 days.

This patent is subject to a terminal disclaimer.

(21) Appl. No.: 12/722,013

(22) Filed: Mar. 11, 2010

(65) Prior Publication Data

US 2010/0232724 A1 Sep. 16, 2010

(30) Foreign Application Priority Data

Mar. 13, 2009 (TW) .............................. 98108179 A

(51) Int. Cl.
*G06K 9/40* (2006.01)
*H04N 7/01* (2006.01)
*G09G 5/02* (2006.01)

(52) U.S. Cl.
USPC ......................... 382/264; 348/441; 345/604

(58) Field of Classification Search .................. 382/162, 382/167, 266, 264, 274–275, 305, 312; 348/241, 348/272, 275, 277, 280, 453, 441; 345/603, 345/604

See application file for complete search history.

(56) References Cited

U.S. PATENT DOCUMENTS

| | | | |
|---|---|---|---|
| 4,223,339 A | | 9/1980 | Lagoni et al. |
| 5,615,282 A | * | 3/1997 | Spiegel et al. ................ 382/167 |
| 6,044,172 A | * | 3/2000 | Allen ............................ 382/166 |
| 6,108,098 A | * | 8/2000 | Owada et al. ................ 358/1.14 |
| 6,160,593 A | | 12/2000 | Nakakuki |
| 6,535,632 B1 | | 3/2003 | Park et al. |
| 7,103,226 B1 | * | 9/2006 | Frank et al. ................... 382/254 |
| 7,110,012 B2 | * | 9/2006 | Messing et al. .............. 345/698 |
| 7,113,206 B2 | | 9/2006 | Nakakuki |
| 7,426,312 B2 | * | 9/2008 | Dance et al. .................. 382/254 |
| 8,077,205 B2 | * | 12/2011 | Berestov et al. .............. 348/187 |

* cited by examiner

*Primary Examiner* — Kanjibhai Patel
(74) *Attorney, Agent, or Firm* — Muncy, Geissler, Olds & Lowe, PLLC

(57) ABSTRACT

An image processing method includes the following steps. First, noise of a first image is filtered, and the first image is converted to obtain a first luminance signal. Second, a color space converting process is performed upon the first image to obtain a second image. Third, the second image is stored and outputted. Fourth, noise of the second image is filtered, and the second image is converted to obtain a second luminance signal. Fifth, a linear computing is performed to obtain a third image. Sixth, an error compensation is performed upon the third image and the second image, and the third image is outputted. Seventh, the color space converting process is performed to obtain and output a fourth image. The linear computing and the error compensation are performed upon a single image to filter the noise of the images, and thus a load of a system may be decreased.

20 Claims, 3 Drawing Sheets

IMAGE PROCESSING DEVICE AND IMAGE PROCESSING METHOD

CROSS REFERENCE TO RELATED APPLICATIONS

This Non-provisional application claims priority under 35 U.S.C. §119(a) on Patent Application No(s). 098108179 filed in Taiwan, Republic of China on Mar. 13, 2009, the entire contents of which are hereby incorporated by reference.

BACKGROUND OF THE INVENTION

1. Field of Invention

The invention relates to an image processing device and an image processing method and, more particularly, to an image processing device and an image processing method which effectively filter image noise.

2. Related Art

With highly development of display systems with multi-media display interfaces, image transmission technology and image broadcast technology are significantly progressing. As for image transmission technology, real-time image display becomes a popular display mode presently, which implements images that are captured by web cameras and are played at the display system immediately.

However, when the web camera or the display system (such as a liquid crystal display (LCD)) is used in an outdoor environment, an environment with insufficient backlight, or an environment with dim light source, the images are inevitably suffered from noise. Therefore, the images displayed at the display system may be greatly distorted and bad video quality is then provided.

In general, to improve the video quality, it is specific functional hardware components (such as an integrated circuit (IC)) that developers spend a lot of time and money to develop. Usually, developers dispose extra developed ICs in the web camera or the display system to rectify the images captured and to be displayed. The IC requires an application specific integrated circuit (ASIC) performing an operation processing to filter the noise, a memory unit and a memory control circuit to store image in the operation processing.

The research and design for the ASIC and a manufacture process consume a lot of time and cost. Furthermore, the IC for processing the image requires specific cooperating memory units and memory control circuits, this leads to a far higher production cost, let along consumes a great deal of power as well.

Moreover, normally, the filtering or analyzing of the image noise is usually performed on a currently displayed image and a former image, via a non-linear computing operation. Thus, when it comes to filtering or analyzing mass of images, operation complexity is increased, but also the hardware loading is rising hastily, eventually reduce the efficiency of the system.

SUMMARY OF THE INVENTION

Present invention provides an image processing device and an image processing method which utilize a central processing unit (CPU) or a graphics processing unit (GPU) of a personal computer or a notebook, a system memory or a video memory, and/or a hard disk to perform a linear computing processing to efficiently filter noise of an image. Furthermore, the manufacture cost is low, the power consumption is low, and the efficiency of the operation is high.

According to an aspect of the invention, an image processing method includes the following steps. First, filtering noise of a first image and converting the first image to obtain a first luminance signal, wherein the first image is defined in a first color space. Second, performing a color space converting process upon the first image according to the first luminance signal to obtain a second image, and wherein the second image is defined in a second color space. Third, storing and outputting the second image. Fourth, filtering noise of the second image, and converting the second image to obtain a second luminance signal. Fifth, performing a linear computing upon the second image according to the first luminance signal and the second luminance signal to obtain a third image, and wherein the third image is defined in the second color space. Sixth, an error compensation is performed upon the third image and the second image, and the third image is outputted. Seventh, the color space converting process is performed according to the third image and the first luminance signal to obtain and output a fourth image, and the fourth image is defined in the first color space.

According to another aspect of the invention, the image processing device includes a first noise filtering and converting module, a first color space converting module, a storing module, a second noise filtering and converting module, a linear processing module, an error compensation module, and a second color space converting module. The first noise filtering and converting module filters noise of a first image and converts the first image to obtain a first luminance signal, and the first image is defined in a first color space. The first color space converting module performs a color space converting process upon the first image according to the first luminance signal to obtain a second image, and the second image is defined in a second color space. The storing module stores and outputs the second image. The second noise filtering and converting module filters the noise of a second image and converts the second image to obtain a second luminance signal. The linear processing module performs a linear computing upon the second image according to the first luminance signal and the second luminance signal to obtain a third image, and the third image is defined in the second color space. The error compensation module performs an error compensation upon the second image and the third image and outputs the third image. The second color space converting module performs the color space converting process according to the third image and the second luminance signal to obtain and output a fourth image, and the fourth image is defined in the first color space.

In an embodiment of the invention, the fourth image is outputted to a display system.

In an embodiment of the invention, the error compensation module outputs the third image to the second color space converting module according to an operation result.

In an embodiment of the invention, the error compensation module outputs the third image to the storing module according to the operation result to replace the second image in the storing module with the third image.

In an embodiment of the invention, the error compensation is a mean squared error (MSE) operation.

In an embodiment of the invention, the linear computing includes utilizing a linear low-pass filter to process the second image on which a subtraction updating operation is already performed to obtain the third image.

According to an embodiment of the invention, the first color space is a RGB color space, and the second color space is a chromatic aberration color space.

In sum up, the image processing device and the image processing method according to the invention utilize the image processing unit to perform the linear computing and the error compensation upon a single image, and utilize a recursive way to filter the noise in the image. In contrast with conventional technology, the image processing device and the image processing method according to the invention do not need to extra develop the hardware components, and they do not need to utilize two or more images to perform the non-linear computing processing. Thus, the load of the system is reduced to improve the efficient of the system, and the cost of the hardware components is reduced.

These and other features, aspects and advantages of the present invention will become better understood with regard to the following description, appended claims, and accompanying drawings.

DETAILED DESCRIPTION OF THE INVENTION

An image processing device and an image processing method according to a preferred embodiment of the invention are illustrated hereinafter accompanying relating drawings.

Figure 1:
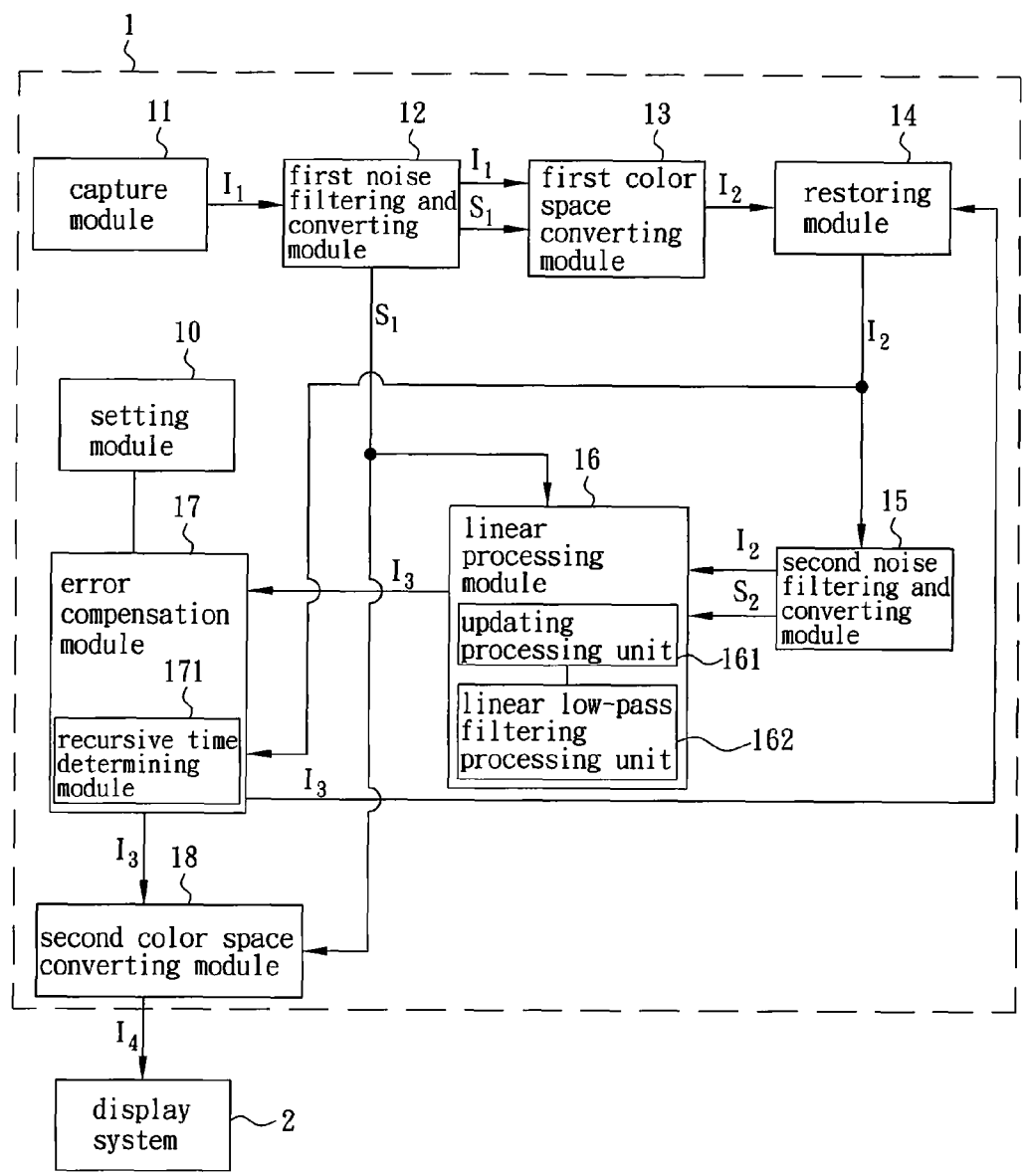
FIG. 1 is a block diagram showing an image processing device according to a preferred embodiment of the invention.

In FIG. 1, an image processing device 1 according to a preferred embodiment of the invention is disposed in a computer. The computer includes a main body and a display system.

The image processing device 1 includes a capture module 11, a first noise filtering and converting module 12, a first color space converting module 13, a storing module 14, a second noise filtering and converting module 15, a linear processing module 16, an error compensation module 17, and a second color space converting module 18.

The capture module 11 may be a web camera, and it captures a first image $I_1$ and transmits the first image $I_1$ to a CPU or a GPU to perform subsequent processing. In this embodiment, the first image $I_1$ is not limited to be captured by the web camera, and it also may be stored in a hard disk, a system memory, or a video memory and is fetched by the capture module 11.

The first noise filtering and converting module 12 is electrically connected with the capture module 11. The noise filtering and converting module 12 receives the first image $I_1$, filters noise of the first image $I_1$, converts the first image $I_1$ to obtain a first luminance signal $S_1$, and it outputs the first image $I_1$ and the luminance signal $S_1$, respectively. The first image $I_1$ is defined in a first color space. In this embodiment, the first color space may be a RGB color space or a CMYK color space.

Additionally, in this embodiment, the first luminance signal $S_1$ includes a luminance domain represented by a luminance value corresponding to a pixel in the first image $I_1$. Furthermore, the first noise filtering and converting module 12 may perform noise filtering operation upon the first image $I_1$ first after receiving the first image $I_1$, and then convert the first image $I_1$ to the first luminance signal $S_1$, and it also may convert the first image $I_1$ to the first luminance signal $S_1$ first after receiving the first image I, and then perform the noise filtering operation upon the first luminance signal $S_1$, which is not limited herein. The main purpose is to obtain the first luminance signal $S_1$ processed via the noise filtering operation.

The first color space converting module 13 is electrically connected with the first noise filtering and converting module 12. The first color space converting module 13 performs the color space converting process upon the first image $I_1$ according to the first luminance signal $S_1$ to obtain a second image $I_2$, and the second image $I_2$ is defined in a first color space. In this embodiment, the first color space is a chromatic aberration color space such as a YCrCb color space, a YUV color space, a YPbPr color space, or a (R-Y)(G-Y)(B-Y) color space.

The storing module 14 is electrically connected with the first color space converting module 13. The storing module 14 stores and outputs the second image $I_2$. In this embodiment, the first color space converting module 13 outputs the second image $I_2$ to the storing module 14, and then the storing module 14 stores and outputs the second image $I_2$.

The second noise filtering and converting module 15 is electrically connected with the storing module 14. The second noise filtering and converting module 15 receives the second image $I_2$, filters noise of the second image $I_2$ and converts the second image $I_2$ to obtain a second luminance signal $S_2$, and it outputs the second image $I_2$ and the second luminance signal $S_2$, respectively.

The linear processing module 16 is electrically connected with the second noise filtering and converting module 15. The linear processing module 16 performs a linear computing upon the second image $I_2$ according to the first luminance signal $S_1$ and the second luminance signal $S_2$ to obtain a third image $I_3$, and the third image $I_3$ is defined in a second color space.

The linear processing module 16 further includes an updating processing unit 161, and the updating processing unit 161 is electrically connected with the first noise filtering and converting module 12 and the second noise filtering and converting module 15. The updating processing unit 161 performs an addition updating operation upon the first luminance signal $S_1$ and the second luminance signal $S_2$, performs a subtraction updating operation upon the second luminance signal $S_2$ and the second image $I_2$, and the linear low-pass filter processing is further performed upon the second image $I_2$ on which the subtraction updating operation is performed via a linear low-pass filtering unit 162 to obtain and output the third image $I_3$. The linear low-pass filtering unit 162 is electrically connected with the updating processing unit 161.

Most noise in the image is a high frequency signal. Therefore, in this embodiment, the linear low-pass filtering unit 162 filters the high frequency noise in the second image $I_2$ on which the subtraction updating operation is performed to obtain the third image $I_3$ with low frequency information.

The error compensation module 17 is electrically connected with the linear processing module 16. The error compensation module 17 performs the error compensation upon the second image $I_2$ and the third image $I_3$ and outputs the third image $I_3$ according to the error compensation result. In this embodiment, the error compensation may be a mean squared error (MSE) operation.

The process of operating the storing module 14 to transmit data to the error compensation module 17 is called once recursive operation. The error compensation module 17 has a predetermined recursive value, a present recursive value, and a predetermined error value. Additionally, the image processing device 1 according to the embodiment further includes a setting module 10 which sets the predetermined recursive value and the predetermined error value in the error compensation module 17.

The error compensation module 17 further includes a recursive time determining module 171. Before the error compensation module 17 is activated, the recursive time determining module compares the content of the present recursive value with the content of the predetermined recursive value. When the content of the present recursive value is equal to that of the predetermined recursive value, the procedure of the recursive operation is ended, and the third image $I_3$ is outputted to the second color space converting module 18.

When the content of the present recursive value is smaller than that of the predetermined recursive value, the error compensation module 17 continues to perform the error compensation to obtain an operation result, and the error compensation module 17 compares the operation result with the predetermined error value. When the operation result is smaller than or equal to the predetermined error value, the procedure of the recursive operation is ended, and the third image $I_3$ is outputted to the second color space converting module 18. When the operation result is larger than the predetermined error value, the error compensation module 17 updates the content of the present recursive value (such as adding one), and it outputs the third image $I_3$ to the storing module 14 to replace the second image $I_2$ stored in the storing module 14. Then, the second image $I_2$ is replaced by the third image $I_3$ to perform the recursive operation.

The second color space converting module 18 is electrically connected with the error compensation module 17. The second color space converting module 18 performs the color space converting process according to the third image $I_3$ and the first luminance signal $S_1$ to obtain and output a fourth image $I_4$, and the fourth image $I_4$ is defined in the first color space. In this embodiment, the fourth image $I_4$ is outputted to a display system 2.

The color space converting modules as stated above convert image data representing the pixels in the image, respectively.

Figure 2:
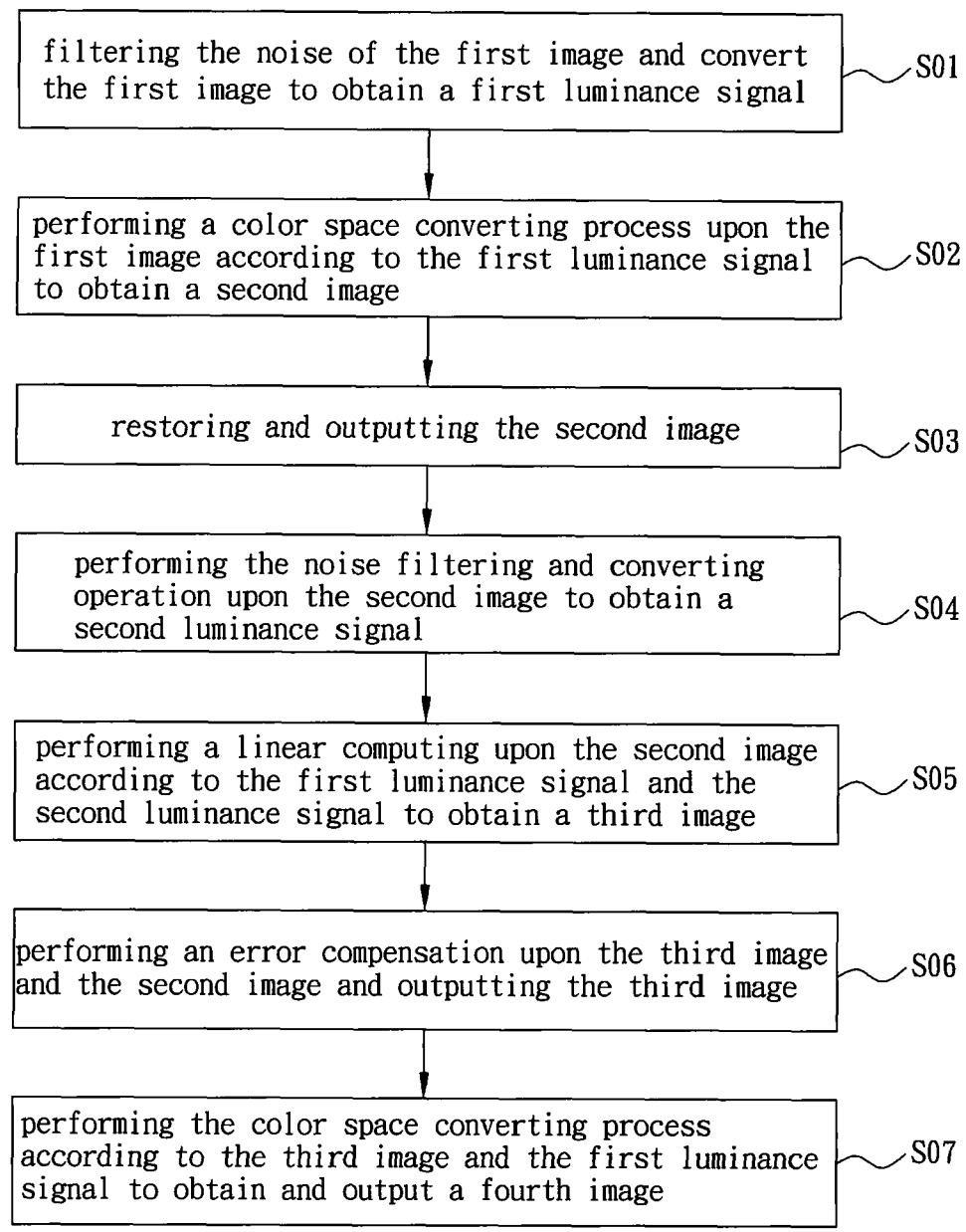
FIG. 2 is a flow chart showing an image processing method according to a preferred embodiment of the invention.

FIG. 2 is an image processing method according to an embodiment of the invention including step S01 to step S07. In this embodiment, the image processing method is used by a web camera cooperating with the computer with a main body and a display system. The image processing method in this embodiment may be operated in the CPU in the main body or the GPU for processing image. In this embodiment, the image processing method is operated in the CPU.

First, the CPU must obtain a first image to process the first image. The first image may be the image captured by the web camera or the image stored in a storage unit (such as the hard disk, the system memory, or the video memory) of the computer.

In step S01, the noise of the first image is filtered, and the first image is converted to obtain a luminance signal, and the first image is defined in a first color space. In this embodiment, the first color space is defined in the RGB color space or the CMYK color space.

In step S02, the color space converting process is performed upon the first image according to a first luminance signal to obtain a second image, and the second image is defined in a second color space. In this embodiment, the second color space is defined in the chromatic aberration color space such as a YUV color space, a YCbCr color space, a YPbPr color space, or a (R-Y)(G-Y)(B-Y) color space. In step S02, the first image may be converted to the luminance signal after the noise filtering operation is performed upon the first image, and the first image also may be converted to the luminance signal before the noise filtering operation is performed upon the luminance signal, which is not limited herein. The main purpose is to obtain the luminance signal processed via the noise filtering operation.

In step S03, the second image is stored and outputted. In this embodiment, the second image is stored in a storing module.

In step S04, the noise filtering and converting operation is performed upon the second image to obtain a second luminance signal.

In step S05, an updating operation is performed upon the second image according to the first luminance signal and the second luminance signal, and a linear low-pass filter processing is performed upon the second image to obtain a third image.

In step S06, the error compensation is performed upon the third image and the second image. The error compensation may be the MSE operation. In this embodiment, if the operation result is smaller than or equal to the predetermined error value, step S07 is performed. However, if the operation result is larger than the predetermined error value, the third image may be outputted to the storing module to replace the image in the storing module, and then the second image is replaced by the third image for performing step S04.

In step S07, the color space converting process is performed upon the third image according to the first luminance signal to obtain a fourth image, and the fourth image is outputted to the display system. The fourth image is defined in the first color space.

Figure 3:
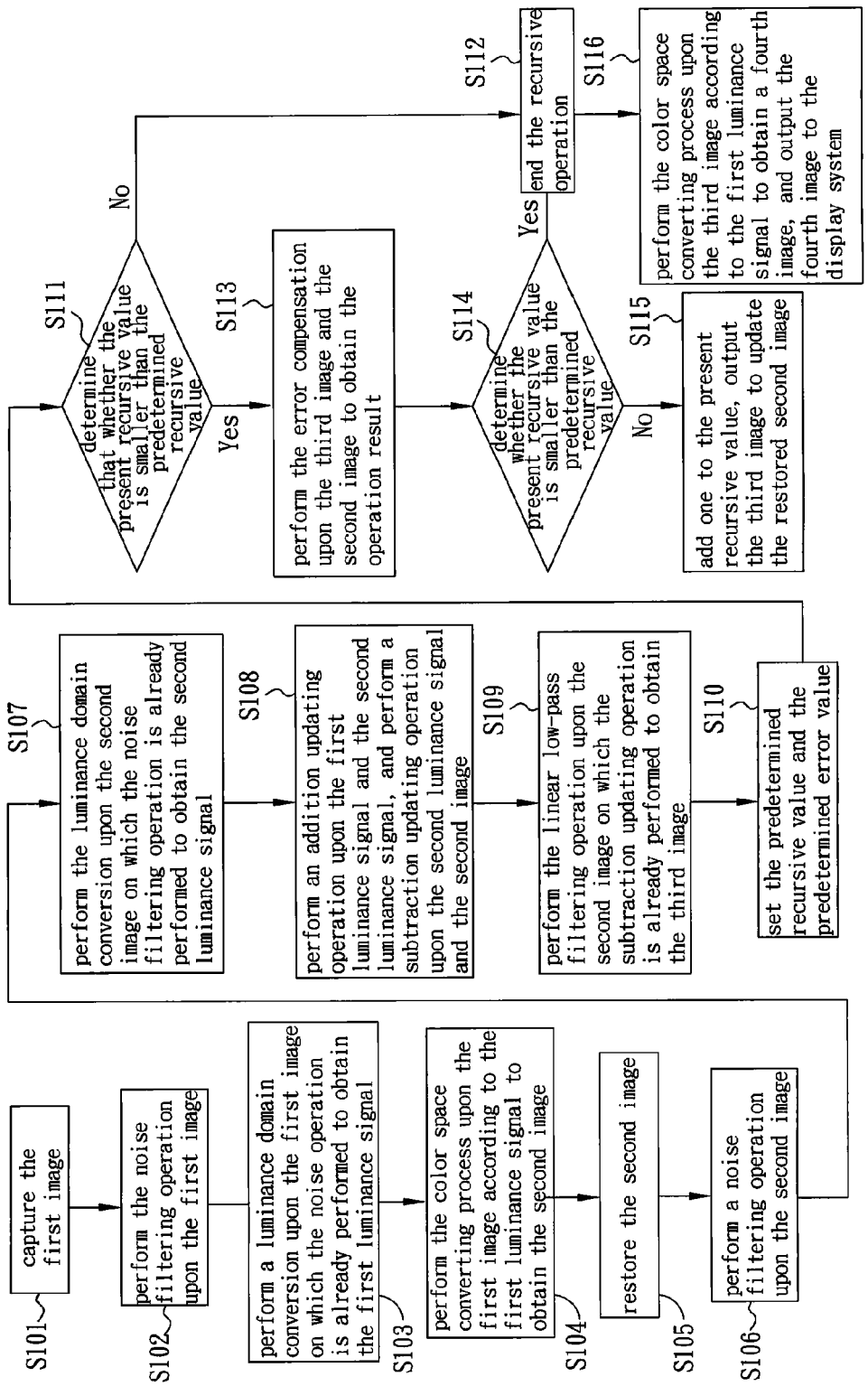
FIG. 3 is a detailed flow chart showing an image processing method according to a preferred embodiment of the invention.

The image processing method according to an embodiment of the invention is illustrated in accompanying FIG. 3 and with the cooperation of the illustration in the above embodiment.

In step S101, the first image is captured and transmitted to the CPU or the GPU to perform subsequent processing.

In step S102, the noise filtering operation is performed upon the first image. In step S103, a luminance domain conversion is performed upon the first image on which the noise filtering operation is already performed to obtain the first luminance signal.

In step S104, the color space converting process is performed upon the first image according to the first luminance signal to obtain the second image.

In step S105, the second image is stored. In step S106, a noise filtering operation is performed upon the second image. In step S107, the luminance domain conversion is performed upon the second image on which the noise filtering operation is already performed to obtain the second luminance signal.

In step S108, an addition updating operation is performed upon the first luminance signal and the second luminance signal, and a subtraction updating operation is performed upon the second luminance signal and the second image.

In step S109, the linear low-pass filtering operation is performed upon the second image on which the subtraction updating operation is already performed to obtain the third image.

In step S110, the predetermined recursive value and the predetermined error value are set. In step S111, whether the present recursive value is smaller than the predetermined recursive value is determined. When the present recursive value is smaller than the predetermined recursive value, step S113 is performed. When the present recursive value is larger than or equal to the predetermined recursive value, step S112 is performed.

In step S112, the recursive operation is ended, and then step S116 is performed.

In step S113, the error compensation is performed upon the second image and the third image to obtain the operation result. In step S114, whether the operation result is smaller than the predetermined error value is determined. When the operation result is smaller than or equal to the predetermined error value, step S112 is performed to end the recursive operation. When the operation result is larger than the predetermined error value, step S115 is performed.

In step S115, one is added to the present recursive value, and the third image is outputted to replace the stored second image. Then, the second image is replaced by the third image to perform step S106.

In step S116, the color space converting process is performed upon the third image according to the first luminance signal to obtain a fourth image, and the fourth image is outputted to the display system.

In sum up, the image processing device and the image processing method according to the invention utilize the image processing unit (such as the CPU or the GPU) to perform the linear computing (such as the addition updating operation, the subtraction updating operation, and the linear low-pass filtering operation) and the error compensation (such as the MSE operation) upon the single image, and utilize a recursive way to filter the noise in the image. In contrast with conventional technology, the image processing device and the image processing method according to the invention do not need to extra develop the hardware components (such as the IC), and they do not need to utilize two or more images to perform the non-linear computing processing. Thus, the load of the system is reduced to improve the efficiency of the system, and the cost of the hardware components is reduced.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An image processing method, comprising:
   filtering noise of a first image and converting the first image to obtain a first luminance signal, wherein the first image is defined in a first color space;
   performing a color space converting process upon the first image according to the first luminance signal to obtain a second image, wherein the second image is defined in a second color space;
   storing and outputting the second image;
   filtering noise of the second image and converting the second image to obtain a second luminance signal;
   performing a linear computing upon the second image according to the first luminance signal and the second luminance signal to obtain a third image, wherein the third image is defined in the second color space;
   performing an error compensation upon the third image and the second image and outputting the third image; and
   performing the color space converting process according to the third image and the first luminance signal to obtain and output a fourth image, wherein the fourth image is defined in the first color space.

2. The image processing method according to claim 1, wherein the first luminance signal is obtained by performing a color image noise filtering operation upon the first image first and performing an image luminance planar conversion subsequently.

3. The image processing method according to claim 1, wherein the first luminance signal is obtained by performing an image luminance planar conversion upon the first image first and performing the noise filtering operation subsequently.

4. The image processing method according to claim 1, wherein the second luminance signal is obtained by performing a noise filtering operation upon the second image first and performing an image luminance planar conversion subsequently.

5. The image processing method according to claim 1, wherein the linear computing comprises performing an updating operation upon the second image according to the first luminance signal and the second luminance signal and performing a linear low-pass filter processing to obtain the third image.

6. The image processing method according to claim 1, wherein the error compensation is a mean-square error (MSE) operation.

7. The image processing method according to claim 1, wherein when an operation result of the error compensation is smaller than or equal to a predetermined error value, the third image is outputted to perform the color space converting process.

8. The image processing method according to claim 1, wherein when an operation result of the error compensation is larger than a predetermined error value, the third image is outputted to replace the stored second image.

9. The image processing method according to claim 1, wherein the fourth image is outputted to a display system.

10. The image processing method according to claim 1, wherein the first color space is a RGB color space or a CMYK color space.

11. The image processing method according to claim 1, wherein the second color space is a chromatic aberration color space.

12. The image processing method according to claim 11, wherein the chromatic aberration color space is a YUV color space, a YCbCr color space, a YPbPr color space, or a (R-Y)(G-Y)(B-Y) color space.

13. An image processing device, comprising:
   a first noise filtering and converting module filtering noise of a first image and converting the first image to obtain a first luminance signal, wherein the first image is defined in a first color space;
   a first color space converting module electrically connected with the first noise filtering and converting module, wherein the first color space converting module performs a color space converting process upon the first image according to the first luminance signal to obtain a second image, and the second image is defined in a second color space;
   a storing module electrically connected with the first color space converting module, wherein the storing module stores and outputs the second image;
   a second noise filtering and converting module electrically connected with the storing module, wherein the second noise filtering and converting module filters the noise of a second image and converts the second image to obtain a second luminance signal;
   a linear processing module electrically connected with the second noise filtering and converting module, wherein the linear processing module performs a linear computing upon the second image according to the first luminance signal and the second luminance signal to obtain a third image, wherein the third image is defined in the second color space;
   an error compensation module electrically connected with the linear processing module, wherein the error compensation module performs an error compensation upon the second image and the third image and outputs the third image; and a second color space converting module electrically connected with the error compensation module, wherein the second color space converting module performs the color space converting process according to the third image and the second luminance signal to obtain and output a fourth image.

14. The image processing device according to claim 13, further comprising:

a capture module electrically connected with the first noise filtering and converting module, wherein the capture module captures the first image and outputs the first image to the first noise filtering and converting module.

15. The image processing device according to claim 13, wherein the error compensation module has a predetermined recursive value, a present recursive value, and a predetermined error value.

16. The image processing device according to claim 13, wherein the error compensation module comprises a recursive time determining module, and the recursive time determining module compares the predetermined recursive value with the present recursive value.

17. The image processing device according to claim 13, wherein the error compensation module compares an operation result of the error compensation with the predetermined error value, and outputs the third image to the second color space converting module or outputs the third image to the storing module according to a comparing result.

18. The image processing device according to claim 13, wherein the linear processing module comprises:

an updating processing unit electrically connected with the first noise filtering and converting module and the second noise filtering and converting module, respectively, wherein the updating processing unit performs an addition updating operation upon the received first luminance signal and the second luminance signal and performs a subtraction updating operation upon the second luminance signal and the second image; and a linear low-pass filtering processing module electrically connected with the updating processing unit, wherein the linear low-pass filtering processing module performs a linear low-pass filter processing upon the second image on which the subtraction updating operation is already performed to obtain and output the third image.

19. The image processing device according to claim 13, wherein the error compensation module is a mean-square error compensation module.

20. The image processing device according to claim 13, wherein the first color space is a RGB color space or a CMYK color space.

* * * * *